United States Patent [19]
Cooper et al.

[11] 3,984,374
[45] Oct. 5, 1976

[54] CATALYST REMOVAL FROM POLYPHENYLENE ETHER REACTION SOLUTIONS BY AQUEOUS EXTRACTION WITH AMMONIUM SALTS

[75] Inventors: Glenn Dale Cooper, Delmar; Daniel Edwin Floryan, Glenmont, both of N.Y.

[73] Assignee: General Electric Company, Pittsfield, Mass.

[22] Filed: Apr. 1, 1975

[21] Appl. No.: 564,125

[52] U.S. Cl. ............................ 260/47 ET; 260/583 N
[51] Int. Cl.² ........................................ C08G 65/44
[58] Field of Search .................... 260/47 ET, 583 N

[56] References Cited
UNITED STATES PATENTS 3,630,995  12/1971  Modan ............................ 260/47 ET
3,783,147  1/1974  Calicchia et al. ................ 260/47 ET
3,838,102  9/1974  Bennett et al. .................. 260/47 ET

*Primary Examiner*—Lester L. Lee
*Attorney, Agent, or Firm*—William F. Mufatti; Edward A. Hedman; James V. Costigan

[57] ABSTRACT

A novel process for the separation of catalyst residues from polyphenylene ether reaction systems is disclosed. The process is based on the discovery that an aqueous solution of an ammonium salt will extract copper from a reaction solution of a polyphenylene ether resin and a complex copper-amine catalyst.

14 Claims, No Drawings

CATALYST REMOVAL FROM POLYPHENYLENE ETHER REACTION SOLUTIONS BY AQUEOUS EXTRACTION WITH AMMONIUM SALTS

This invention provides a novel process for the separation of catalyst residues from polyphenylene ether reaction mixtures by extraction with aqueous solutions of ammonium salts.

BACKGROUND OF THE INVENTION

The polyphenylene ethers and processes for their preparation are well known in the art. They are described in Hay, U.S. Pat. No. 3,306,874 and U.S. Pat. No. 3,306,875 and Blanchard et al, U.S. Pat. No. 3,219,625 and U.S. Pat. No. 3,219,626 all of which are incorporated by reference. Other patents which show the preparation of polyphenylene ethers include Price et al, U.S. Pat. No. 3,382,212; Kobayashi et al, U.S. Pat. No. 3,455,880; Bennett and Cooper, U.S. Pat. No. 3,796,689; Bennett and Katchman, U.S. Pat. No. 3,787,362; Cooper, Pat. No. 3,733,307; Cooper and Bennett, U.S. Pat. No. 3,733,299, all of which are incorporated by reference.

The processes most generally used to produce the polyphenylene ethers involve the self-condensation of a monovalent phenol in the presence of an oxygen-containing gas and a catalyst comprising a metal-amine complex.

These processes are carried out in the presence of an organic solvent and the reaction is usually terminated by removal of the catalyst from the reaction mixture. This has been carried out by extraction with mineral acids such as hydrochloric or sulfuric acid. This gives good copper removal, but has the disadvantage that hydrochloric acid is extremely corrosive to stainless steel, so that process equipment must be made of expensive special alloys. The same is true, to a lesser extent, of aqueous sulfuric acid. Both sulfuric and hydrochloric acid tend to react with PPO in solution, introducing small amounts of sulfur or chlorine into the polymer, with a reduction in stability of the polymer under processing conditions.

Extraction with organic acids such as acetric acid has also been used. This procedure also gives good copper removal and extracts both copper and amine into the aqueous phase. A separate step (neutralization and distillation) is required to recover the amine; this is also true for extraction with mineral acid. A major disadvantage is that the effluent water from the plant contains large amounts of sodium acetate. Because of its chemical oxygen demand, environmental regulations require that this be removed before the water is discharged. This is expensive; the water must be impounded and the sodium acetate destroyed by bacterial action before it can be discharged. Also, extraction with chelating agents such as EDTA, triethylene tetraamine, etc., has been employed for this purpose. This procedure gives good copper removal and leaves the amine in the organic phase, so that it can be recovered simply by distillation with the solvent. The main disadvantage is that the chelating agents wind up in the water and environmental regulations prohibit their discharge. The variation on this procedure, in which the extraction step is eliminated and the polymer precipitated directly after addition of the chelating agent, has the same advantages and disadvantages. It has now been found that aqueous solutions of ammonium salts may be used to extract the copper-amine catalyst from a polyphenylene ether reaction mixture. This procedure gives adequate copper removal and does not cause any environmental problems. Most of the amine component of the catalyst remains in the organic phase and can be recovered by distillation with the solvent.

Accordingly, it is a primary object of this invention to provide an effective process for the removal of the copper-amine catalyst from a polyphenylene ether reaction mixture.

DETAILED DESCRIPTION OF THE INVENTION

This invention provides in a process for forming a polyphenylene ether by an oxidative coupling reaction in the presence of a complex copper-amine catalyst comprising passing an oxygen-containing gas through a reaction solution of a phenol and said catalyst, the improvement which comprises separating said catalyst by contacting the reaction solution with an aqueous solution of an ammonium salt and thereafter separating the polyphenylene ether from the reaction mixture.

The preferred polyphenylene ether resins are of the formula:

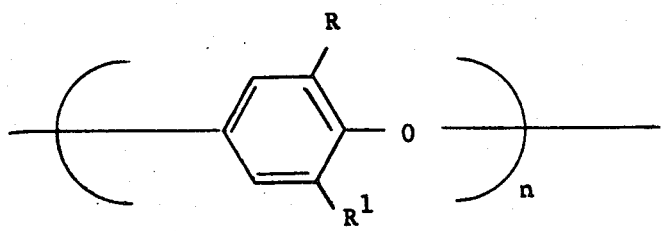

wherein the oxygen ether atom of one unit is connected to the benzene nucleus of the next adjoining unit, $n$ is an integer of at least 50; and R and $R^1$ are monovalent substituents selected from hydrogen, halogen, hydrocarbon radicals, halo-hydrocarbon radicals having at least two carbon atoms between the halogen atom and the phenyl nucleus.

The preferred polyphenylene ether resin is poly(2,6-dimethyl-1,4-phenylene ether).

The particular ammonium salt is not critical and many different inorganic salts may be used. Useful ammonium salts include ammonium sulfate, ammonium carbonate, ammonium chloride, mono and diammonium phosphate, ammonium nitrate, ammonium iodide, ammonium bromide and the like.

The concentration of the ammonium salt is not critical and concentrations of from 1–60% w/w may be employed. A sufficient quantity of the aqueous solution of the ammonium salt should be employed so that the ratio of the ammonium salt to the complex copper-amine catalyst is from 1:1 to 50:1. The preferred ratio is about 10:1.

The invention may be practiced by contacting a reaction solution of a polyphenylene ether resin with an aqueous solution of the ammonium compound in a batchwise or in a continuous manner. Subsequently, the organic reaction phase is separated from the aqueous ammonium salt phase that contains the extracted catalyst. The extraction may be carried out by the use of conventional countercurrent liquid-liquid extraction apparatus or it may be carried out in any vessel having suitable means for agitation and separation of the organic and aqueous phases. Decantation or other known methods may be employed to separate the aqueous phase from the organic phase. Thereafter, an anti-solvent such as methanol may be added to the reaction mixture to precipitate the polymer or the polymer may be isolated according to known procedures such as crumbing, spray drying, steam precipitation, etc.

DESCRIPTION OF THE PREFERRED EMBODIMENTS

EXAMPLE 1

A reaction mixture containing 582 ml toluene; 0.39 g sodium bromide; 0.25 g cupric chloride; 10.9 g dibutyl amine; and 70 g 2,6-xylenol was subjected to oxidative polymerization. After the polymer reached an I.V. of 0.55 dl/g as measured in $CHCl_3$ at 30°C., the reaction mixture was contacted three times with 10% $(NH_4)_2SO_4$ in water ( $(NH_4)_2 SO_4$ to copper molar ratio= 10:1). After phase separation the poly(2,6-dimethyl-1,4-phenylene ether) was recovered and was found to contain 10 ppm of copper.

By comparison, the same solution of poly(2,6-dimethyl-1,4-phenylene ether) treated with 50% acetic acid solution in water (acetic acid to catalyst molar ratio= 2:1) gave an isolated poly(2,6-dimethyl-1,4-phenylene ether) containing 18.5 ppm of copper.

EXAMPLE 2

A toluene solution of poly(2,6-dimethyl-1,4-phenylene ether) containing a cupric chloride-dibutylamine catalyst was extracted three times with 10% ammonium carbonate in water (ammonium carbonate to copper ratio 10:1). On isolation, the poly(2,6-dimethyl-1,4-phenylene ether) was found to contain 9 ppm copper.

By comparison, a solution of poly(2,6-dimethyl-1,4-phenylene ether) prepared as in the examples, but not treated to remove the catalyst, gave an isolated poly(2,6-dimethyl-1,4-phenylene ether) containing 382 ppm of copper.

EXAMPLE 3

A reaction mixture prepared as described in Example 1 was divided into three equal portions. One portion was extracted three times with a 10% solution of ammonium chloride in water (molar ratio of ammonium salt: Cu= 10:1) and the polymer was isolated by precipitation with methanol. The poly(2,6-dimethyl-1,4-phenylene) ether contained 31 ppm of copper. A second portion was similarly extracted with 10% ammonium acetate in water; the polymer contained 32 ppm of copper. The third portion was extracted five times with 30% ammonia in water (10:1 ratio of ammonia: copper); the polymer contained 136 ppm copper.

EXAMPLE 4

Catalyst solution was prepared by adding 5 ml of a solution of 3.2 g of cupric bromide and 35 g of 2,6-xylenol in 200 ml of methanol to 50 ml of toluene, followed by 0.325 g of N,N'-di-tert-butyl ethylene diamine and 1.9 g of butyldime thylamine. The catalyst solution was added to a stirred 1-liter reactor with 400 ml of toluene. A rapid stream of oxygen was introduced near the bottom of the reactor and a solution of 105 g of 2,6-xylenol in 105 g of toluene was added over a period of 30 minutes, with the reaction mixture maintained at a temperature of 40°C. After 65 minutes a small portion of the mixture was stirred with methanol to precipitate the poly(2,6-dimethyl-1,4-phenylene) ether; it contained 82 ppm of copper. The remainder of the mixture was stirred with 50 ml of a 10% solution of ammonium chloride in water, centrifuged, and the organic phase was separated. The polymer was precipitated by addition of methanol; it contained only 21 ppm of copper.

Obviously, other modifications and variations of the present invention are possible in the light of the above teachings. It is, therefore, to be understood that changes may be made in the particular embodiments of the invention described which are within the full intended scope of the invention as defined by the appended claims.

We claim:

1. In a process for forming a polyphenylene ether by an oxidative coupling reaction in the presence of a complex copper-amine catalyst comprising passing an oxygencontaining gas through an organic reaction solution of a phenol and said catalyst, the improvement which comprises contacting the organic reaction solution with an aqueous solution of an ammonium salt to extract the copper component of the catalyst, resolving the aqueous phase containing the copper component of the catalyst as a separate phase from the organic reaction mixture and thereafter separating the polyphenylene ether from the organic reaction mixture.

2. A process as defined in claim 1 wherein said polyphenylene ether is selected from the formula:

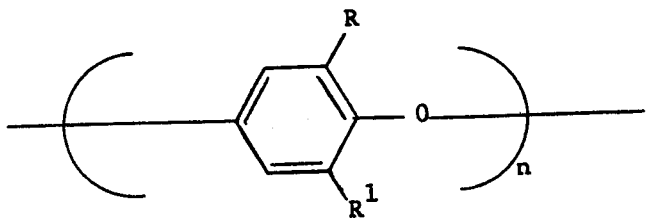

wherein the oxygen ether atom of one unit is connected to the benzene nucleus of the next adjoining unit, $n$ is an integer of at least 50; and R and $R^1$ are monovalent substituents selected from hydrogen, halogen, hydrocarbon radicals, halo-hydrocarbon radicals having at least two carbon atoms between the halogen atoms and the phenyl nucleus, hydrocarbonoxy and halohydrocarbonoxy radicals having at least two carbon atoms, between the halogen atom and the phenyl nucleus.

3. A process as defined in claim 2 wherein said polyphenylene ether is poly(2,6-dimethyl-1,4-phenylene ether).

4. A process as defined in claim 2 wherein said copper amine complex catalyst includes dibutylamine.

5. A process as defined in claim 2 wherein the ammonium salt is ammonium sulfate.

6. A process as defined in claim 2 wherein the ammonium salt is ammonium nitrate.

7. A process as defined in claim 2 wherein the ammonium salt is mono or di-ammonium phosphate.

8. A process as defined in claim 2 wherein the ammonium salt is ammonium carbonate.

9. A process as defined in claim 2 wherein the ammonium salt is ammonium chloride.

10. A process as defined in claim 2 wherein said aqueous solution of an ammonium salt contains from 1 to 60% w/w of the ammonium salt.

11. In a process for forming a polyphenylene ether by an oxidative coupling reaction in the presence of a copper-amine catalyst comprising passing an oxygen-containing gas through an organic reaction solution containing 2,6-xylenol and said catalyst, the improvement which comprises contacting the organic reaction solution with an aqueous solution of an ammonium salt to extract said catalyst; separating the aqueous solution of the ammonium salt, containing the extracted copper component of the catalyst, as a separate phase from the organic reaction solution; and thereafter recovering the poly(2,6-dimethyl-1,4-phenylene ether) from the organic reaction solution by adding an antisolvent for the poly(2,6-dimethyl-1,4-phenylene ether).

12. A process as defined in claim 11 wherein the ammonium salt is ammonium sulfate or ammonium carbonate.

13. A process as defined in claim 12 wherein the reaction solvent is toluene and the antisolvent is methanol.

14. In a process for forming a polyphenylene ether by an oxidative coupling reaction in the presence of a copper-amine catalyst comprising passing an oxygen-containing gas through an organic reaction solution containing 2,6-xylenol and said catalyst, the improvement which comprises contacting the organic reaction solution with a sufficient volume of a 1 to 60% w/w aqueous solution of an ammonium salt selected from the group consisting of ammonium sulfate and ammonium carbonate so that the ratio of said ammonium salt to the copper-amine catalyst is from 1:1 to 50:1 to extract the copper component of the catalyst; separating the aqueous solution of ammonium sulfate or ammonium carbonate, that contains the extracted copper component of the catalyst, as a separate phase from the organic reaction solution and thereafter recovering the poly(2,6-dimethyl-1,4-phenylene ether) from the organic reaction solution by adding methanol to said organic reaction solution to cause the poly(2,6-dimethyl-1,4-phenylene ether) to precipitate.

* * * * *